Nov. 27, 1928.
T. A. BEANEY
1,693,361
MACHINE FOR CUTTING OFF STOCK
Filed March 10, 1927     4 Sheets-Sheet 1
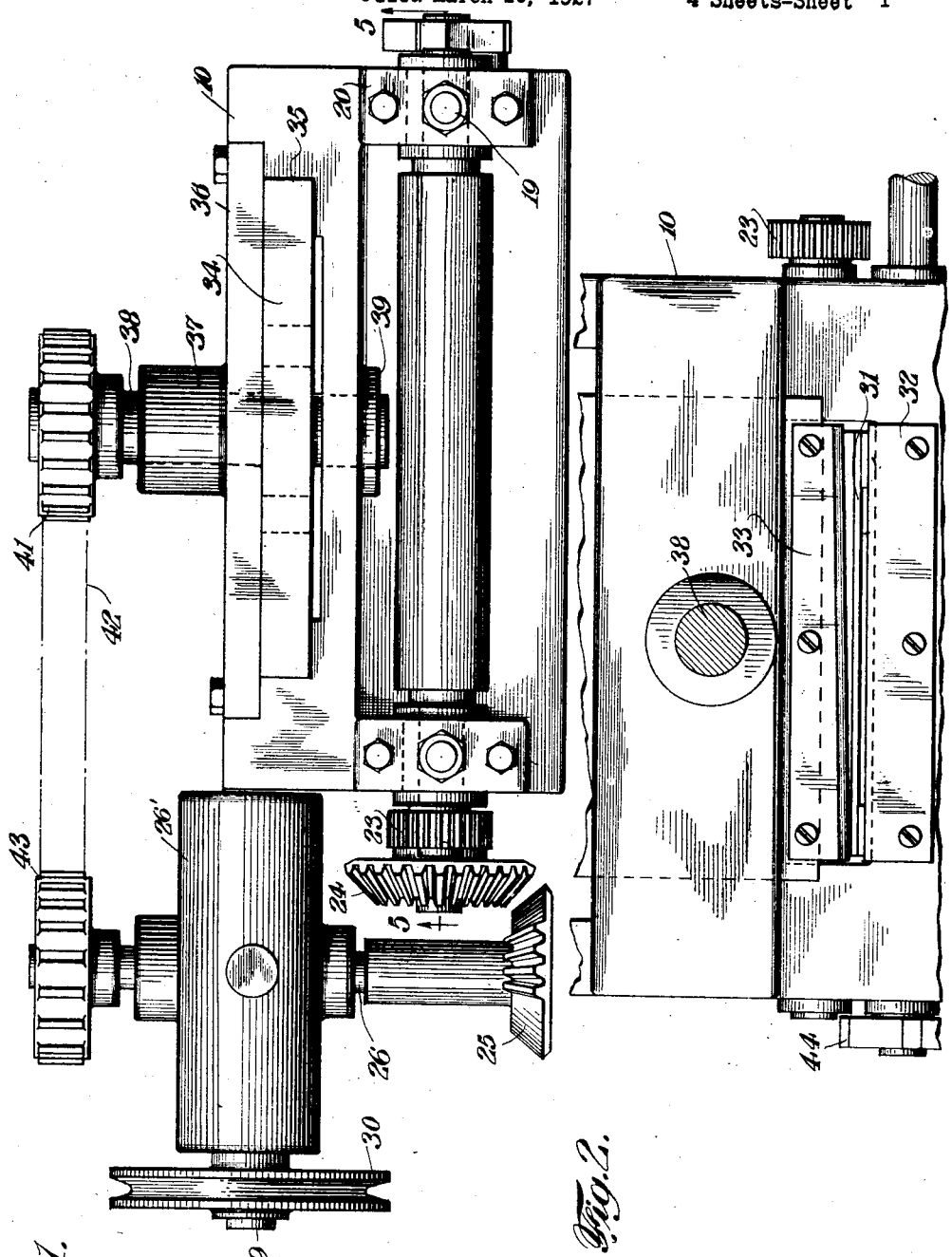
INVENTOR.
Thomas A. Beaney.
BY
Ramsay Hoguet
ATTORNEY

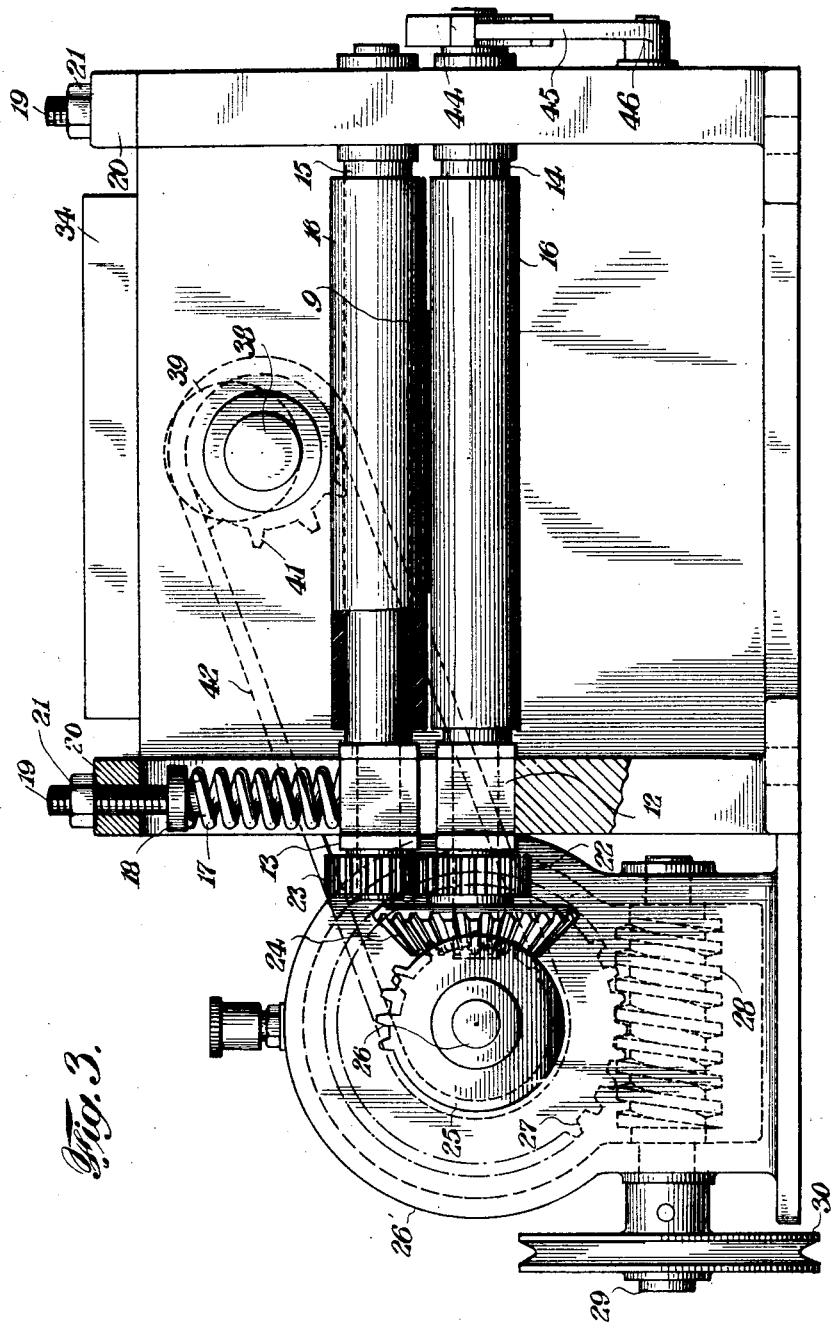

Nov. 27, 1928.  
T. A. BEANEY  
1,693,361  
MACHINE FOR CUTTING OFF STOCK  
Filed March 10, 1927  
4 Sheets-Sheet 3
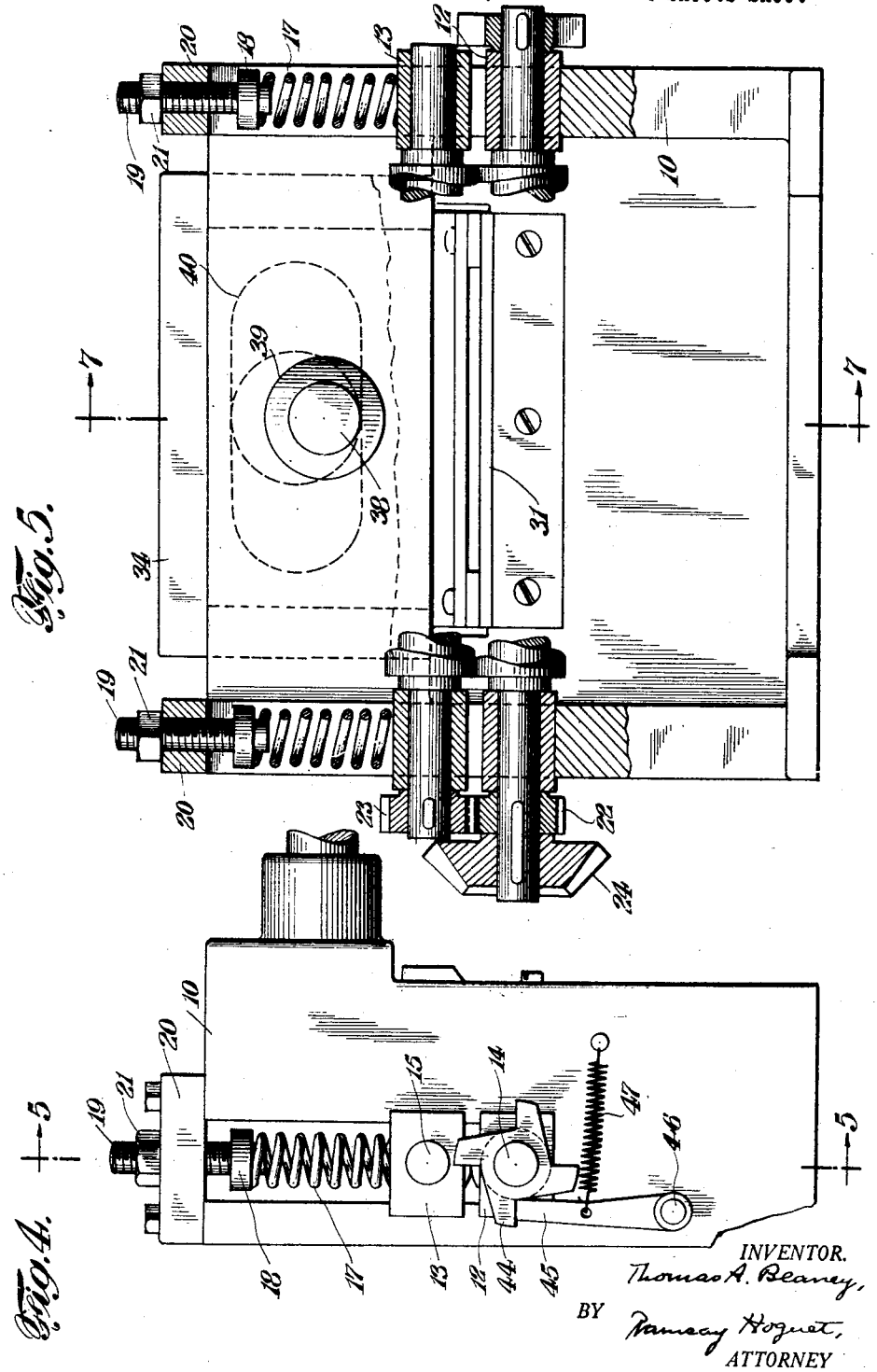
INVENTOR.  
Thomas A. Beaney,  
BY Ramsay Hoguet,  
ATTORNEY Nov. 27, 1928.

T. A. BEANEY 1,693,361

MACHINE FOR CUTTING OFF STOCK

Filed March 10, 1927

INVENTOR.
Thomas A. Beaney,
BY Ramsay Hogust,
ATTORNEY

Patented Nov. 27, 1928.

1,693,361

UNITED STATES PATENT OFFICE.

THOMAS A. BEANEY, OF POUGHKEEPSIE, NEW YORK, ASSIGNOR TO BEANEY RUBBER COMPANY, INC., OF NEW YORK, N. Y., A CORPORATION OF NEW YORK.

MACHINE FOR CUTTING OFF STOCK.

Application filed March 10, 1927. Serial No. 174,173.

My invention relates to improvements in machines for cutting off sheet stock. The invention is especially useful in cutting off stock into short strips and the machine is intended to produce a strong, simple, rapidly working structure which will cut off sheet stock rapidly and accurately.

The machine is intended further to be a rugged, durable device which will operate very rapidly and be generally satisfactory for the intended purpose. In practice I have used the machine for cutting off stock loops for tire flaps, a use for which it is well adapted but it is not limited to this or any other use.

Reference is to be had to the accompanying drawings forming a part of this specification, in which similar reference characters indicate corresponding parts in all the views.

Figure 1 is a plan view of the machine embodying my invention.

Figure 2 is a broken sectional rear elevation on the line 2—2 of Figure 7.

Figure 3 is a broken front elevation of the machine.

Figure 4 is an end view.

Figure 5 is a cross section on the line 5—5 of Figure 4 with parts broken away.

Figure 7:
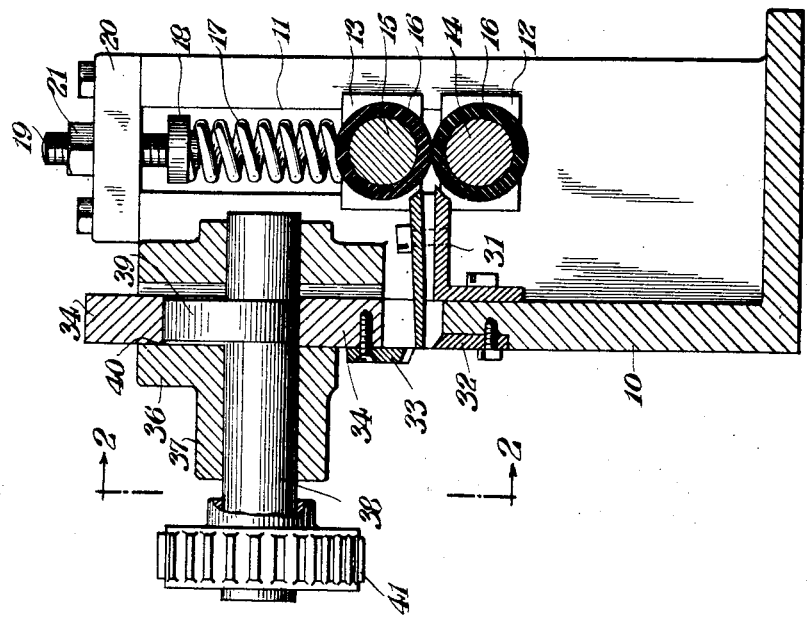
Figure 7 is a section on the line 7—7 of Figure 5.
Figure 6:
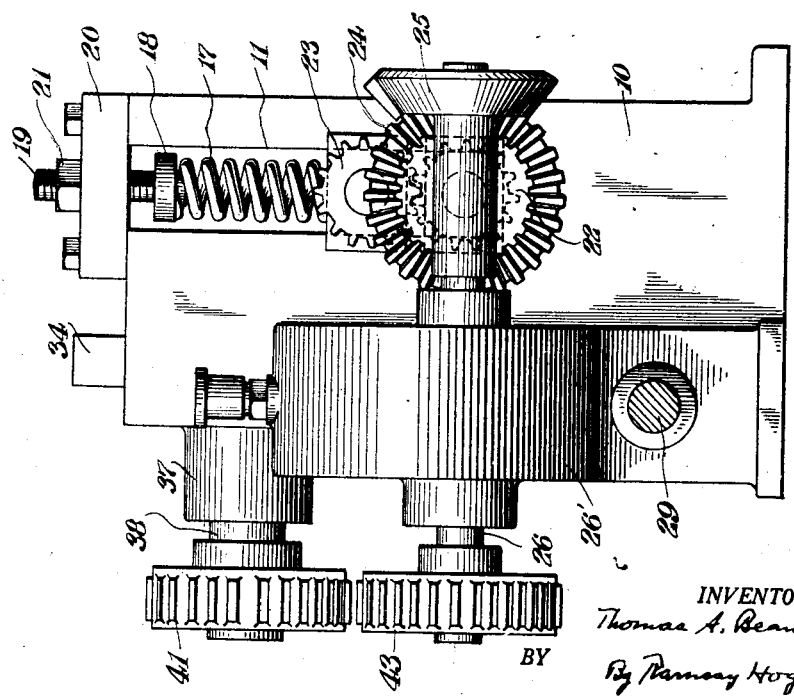
Figure 6 is a sectional end view showing the end opposite that illustrated in Figure 4.

The machine is provided with a suitable frame 10, which is slotted vertically at opposite ends as shown at 11 to carry the boxes 12 and 13 of the feed rolls 14 and 15. These boxes are arranged in rather a conventional way, the lower box 12 being stationary and the upper box 13 being adjustable to enable the proper pressure to be maintained upon the stock which passes between the feed rolls. The rolls are both preferably covered with rubber composition or some substance to give additional friction and the stock 9 is fed through the machine by means of the aforesaid rolls.

The boxes 13 of the upper feed roll are pressed downward by springs 17, the upper end of each spring abutting with a collar 18 which is adjusted up and down by the bolt 19. The latter extends through the top 20 of the frame and is regulated by a nut 21. This is not an unusual arrangement and by adjusting the nut 21, the tension of the feed rolls upon the stock can be nicely regulated.

The shafts of the feed rolls are geared together by gears 22 and 23 so that they will turn in unison and the lower shaft or roll is driven by a pinion 24 which meshes with a mutilated pinion 25 on the shaft 26, this being arranged at right angles to the feed roll 14 and turning in suitable bearings. It will be noted that the pinion 25 has but four teeth and is arranged to give the feed rolls a quick movement for a quarter of a turn as these teeth engage the pinion 22. But obviously, if a longer or shorter feed movement were desired the pinion 25 would have a greater or less number of teeth.

The shaft 26 is provided with a driving worm gear 27 enclosed in the casing 26' and the worm gear meshes with the worm or screw 28 on the shaft 29. The latter acting as a driving shaft and as shown it is provided with a driving pulley 30 but obviously it might be turned by other suitable source of power.

Immediately behind the feed rolls 14 and 15 is a chute 31 through which the stock passes and at the rear end of the chute and just below the line of travel of the stock is a fixed knife 32, rigidly secured to the frame 10 and above this is a knife 33 which shears across the end of the chute and also across the knife 32, thus cutting off the stock. The machine is timed so that the knife 33 is reciprocated while the feed rests, i. e., while the teeth or the pinion 25 are out of engagement with the teeth of the pinion 24.

The knife 33 is carried by a vertically moving crosshead 34 which slides in a way 35 (see Figure 1). A plate 36 serves to hold the crosshead in place and carries a bearing 37 for the knife operating shaft 38. This shaft is arranged at right angles to the plane of the stock feed and carries a cam or eccentric 39, moving in a slot 40 of the crosshead 34 so that each rotation of shaft 38 causes the cam acting against the walls of the slot 40 to move the crosshead and knife 33 quickly down and up.

It will be readily seen that if the teeth of the pinion 25 engage the teeth of the pinion 24 during the up stroke of the cross head 34 the stock can be thrust through the chute 31 for a distance to have a short strip cut off at the next down stroke of the knife 33, and as this machine is intended to cut stock into short strips, it will be seen that it can be made to work very rapidly because the knife movement is continuous while the feed movement is intermittent.

The shaft 38 can be driven advantageously by a spur wheel 41 and this is connected by a chain belt 42 with a spur wheel 43 on the shaft 26 already referred to. This arrangement makes a positive drive and makes it easier to time the cut off with respect to the stock feed.

To prevent any back lash of the stock feed, I employ a star wheel 44 (see Figure 4), together with a pawl 45. The star wheel is adapted to check the lower feed roll 14 against any movement and consequently the wheel has a number of teeth proportional to the arc occupied by teeth on the mutilated gear 25, and if the feed is to be changed, the star wheel and mutilated gear are changed so that this proportion will be maintained. The teeth 44 of the star wheel engage the end of the pawl 45 which is pivoted at 46 and pressed by a spring 47 into engagement with the star wheel.

From the foregoing description, it will be seen that I have devised an exceedingly simple and powerful machine which operates with great rapidity and accuracy and it is very durable, largely because the feed has a quick intermittent movement and the cut off a continuous movement.

I claim:—

A machine for cutting off stock comprising a stock feed, a cutter shearing across the stock behind the stock feed, a mutilated gear driving the stock feed, and a detent for the stock feed comprising a wheel having a number of teeth proportional to the arc occupied by teeth on the mutilated gear and a pawl for said teeth.

In testimony whereof, I have signed my name to this specification this 9th day of March, 1927.

THOMAS A. BEANEY.